United States Patent Office 3,424,435
Patented Jan. 28, 1969

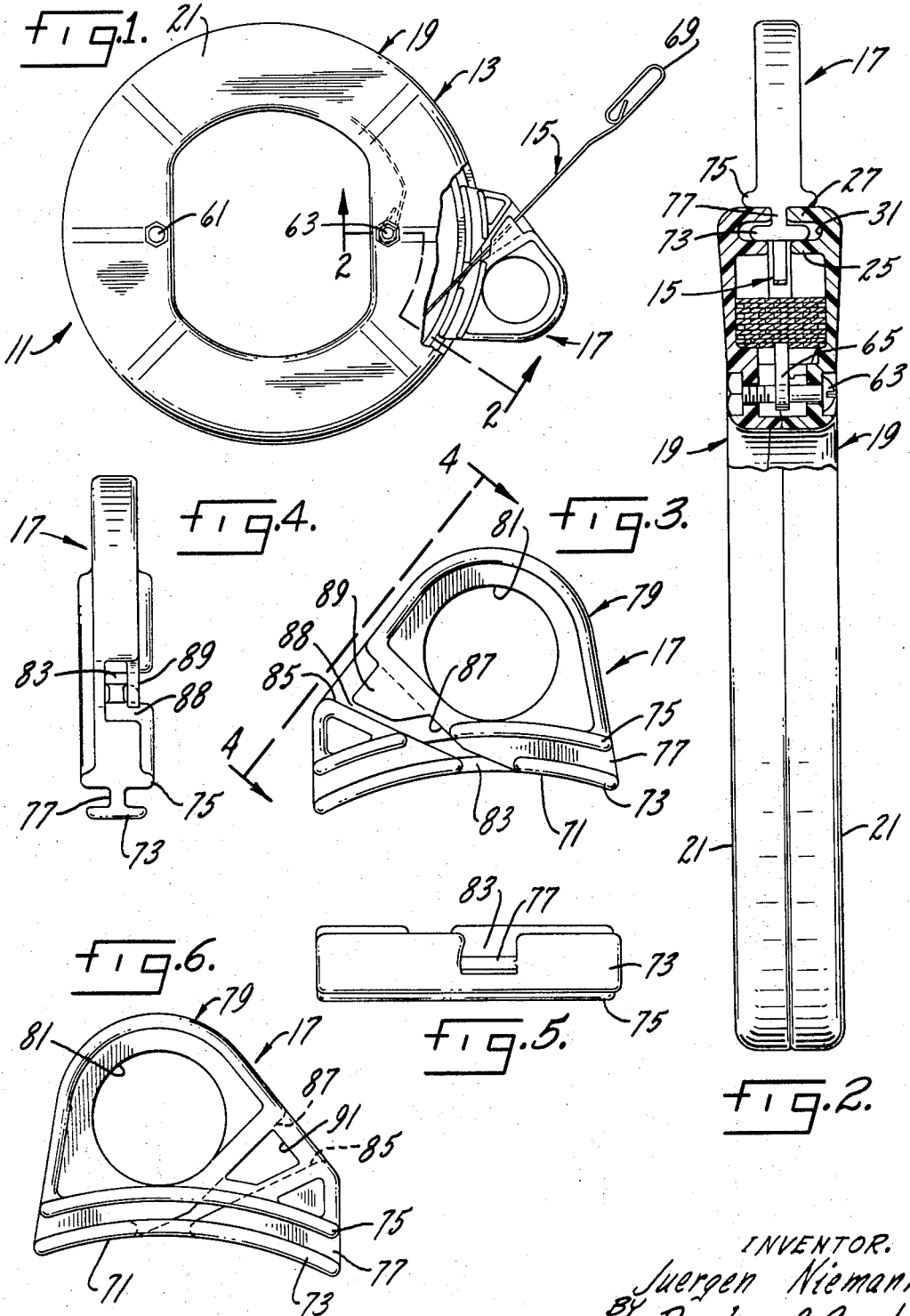

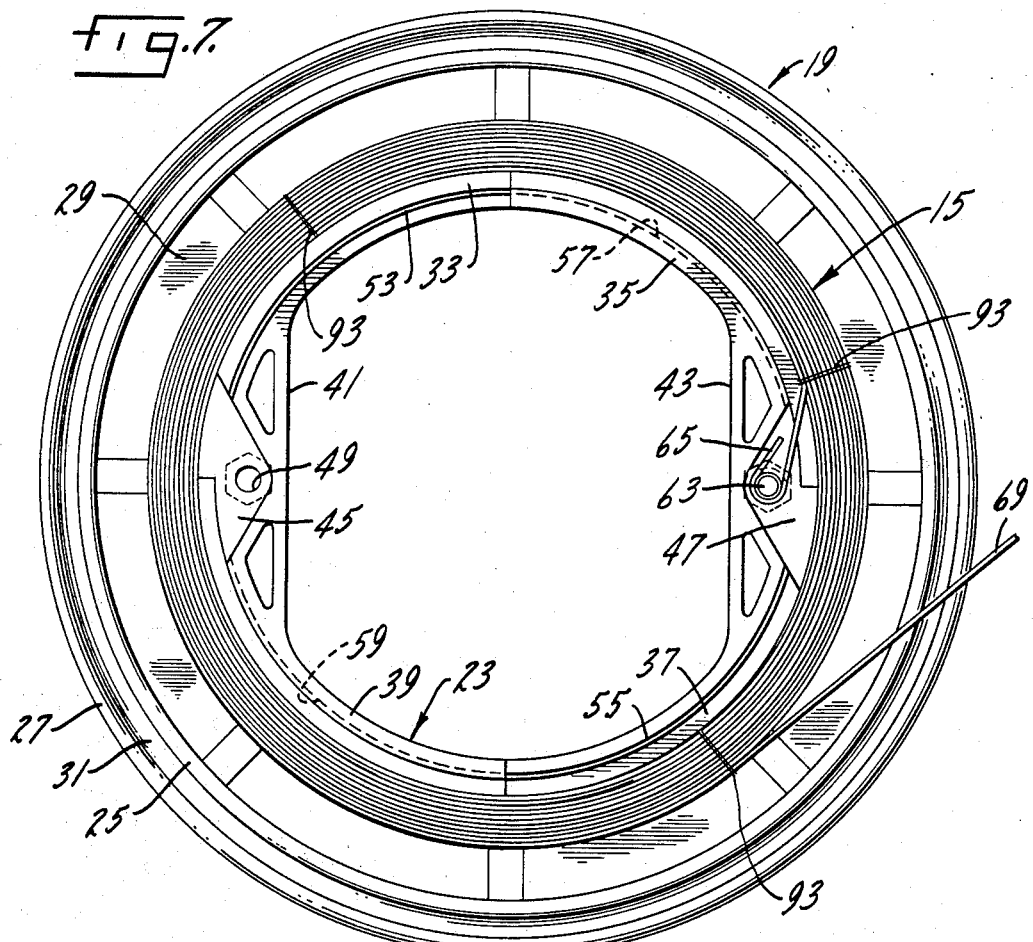
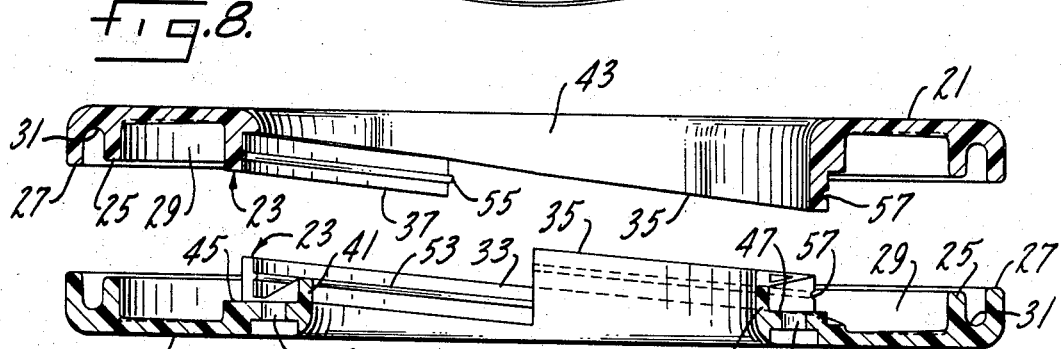
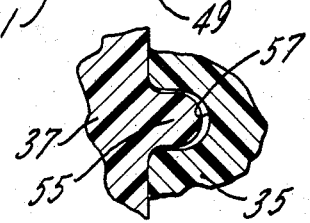

3,424,435
FISH TAPE REEL ASSEMBLY
Juergen Niemann, Sycamore, Ill., assignor to Ideal Industries, Inc., Sycamore, Ill., a corporation of Delaware
Filed Oct. 7, 1966, Ser. No. 585,035
U.S. Cl. 254—134.3       21 Claims
Int. Cl. B65h 75/16; E21b 31/00

ABSTRACT OF THE DISCLOSURE

An electrician's fish tape reel assembly including an electrician's fish tape, a reel adapted to receive and hold the electrician's fish tape and to permit unwinding and rewinding of the tape relative thereto and a winder for the tape. The reel includes a pair of generally annular-shaped sections, each of which is generally flat and has upstanding inner and outer peripheral walls with similar walls of each section adapted to contact one another when the sections are connected together.

---

This invention relates to an electrician's fish tape reel and winder assembly.

An object of this invention is a fish tape reel made in sections which are removably connected to one another to facilitate removal and replacement of a fish tape.

Another object is a fish tape reel and tape winder adapted to receive a precoiled fish tape.

Another object is a fish tape reel made in sections which are tensioned as a result of assembly to provide a drag friction engagement between the sections and the fish tape.

Another object is a fish tape reel having a guide in which a fish tape may be inserted from the side thereof.

Another object is a fish tape reel and tape winder which eliminate jamming of the fish tape during winding and unwinding operations.

Another object is a fish tape reel made in two identical sections which may be releasably interlocked with each other.

Another object is a fish tape reel made in two identical sections which may be joined together by engaging mating threads thereon and rotating one of the sections through an angle of 90° relative to the other.

Another object is a fish tape reel made in two identical sections which move axially together upon rotatably interlocking with each other.

Another object is a fish tape reel made in interlocking sections which are held against unlocking rotation by releasable fastening means.

Another object is a fish tape reel in which one of the removable fastening means is utilized to anchor the bitter end of the tape.

Another object is a fish tape reel and tape winder adapted to receive a precoiled tape which is held coiled by burstible tie means until put into use.

Another object is a fish tape reel assembly in which the reel sections and tape winder are made of different plastics to reduce friction between these parts.

Other objects may be found in the following specification, drawings and claims.

The invention is illustrated more or less diagrammatically in the following drawings wherein:

FIGURE 1 is a plan view of the assembled reel, fish tape and tape winder with portions shown in phantom and other portions cut away for clarity;

FIGURE 2 is an enlarged view taken along line 2—2 of FIGURE 1;

FIGURE 3 is an enlarged plan view of the tape winder shown in FIGURE 1;

FIGURE 4 is a view taken along line 4—4 of FIGURE 3;

FIGURE 5 is a bottom plan view of the tape winder of FIGURE 3;

FIGURE 6 is a plan view of the opposite side of the tape winder as shown in FIGURE 3;

FIGURE 7 is a plan view of a section of the reel with a coiled tape positioned and anchored therein;

FIGURE 8 is an exploded view of two sections of the fish tape reel positioned for assembly; and FIGURE 9 is an enlarged end view of mating threads of the reel sections.

A fish tape reel assembly 11 embodying the novel features of the invention is shown in FIGURE 1. This assembly includes a reel 13, a fish tape 15 and a fish tape winder 17. The reel 13 is made of two identical generally annular shaped sections 19 which may be formed of a plastic such as high density polyethylene. As seen most clearly in FIGURES 2, 7 and 8, each reel section 19 has a generally flat radial or side wall 21, an upstanding inner peripheral wall 23, an intermediate upstanding wall 25 and an outer upstanding peripheral wall 27. The intermediate wall is not as high as the outer wall. An inner annular channel 29 is defined by walls 21, 23 and 25 and an outer annular channel 31 is defined by walls 21, 25 and 27.

As shown in FIGURES 7 and 8, the inner wall 23 of each reel section 19 includes four quadrant shaped segments 33, 35, 37 and 39 and two chordal shaped segments 41 and 43. The chordal segments are located diametrically opposite to each other and are located radially inwardly of the quadrant sections. Abutting portions of adjacent quadrant segments are removed adjoining the chordal walls as at 45 and 47. The height of each quadrant section relative to the side wall 21 varies uniformly circumferentially with the minimum height of one segment being located adjacent the maximum height of an adjacent segment. Openings 49 and 51 in the end wall 21 are located adjacent the chordal segments 41 and 43.

Quadrant shaped segments 33 and 37 of wall 23 are spaced radially outwardly a greater distance than segments 35 and 39. Segments 33 and 37 have radially inwardly projecting ribs 53 and 55 which slope in height relative to the side wall 21 in the same manner as the height of their segments. Segments 35 and 39 have radially outwardly opening grooves 57 and 59 which slope in height relative to the side wall 21 in the same manner as the height of their segments. The projecting ribs 53 and 55 are formed and adapted to mesh with the grooves 57 and 59 in the manner shown in FIGURE 9 to interlock sections 19 to form a reel 13.

Threaded fasteners 61 and 63 are provided to extend through aligned pairs of openings 49 and 51 in the reel sections 19 to prevent unlocking rotation of the interlocked sections 19. A fish tape 15 is adapted to fit in the inner annular channels 29 formed in the reel sections with the looped bitter end 65 of the tape secured to one of the threaded fasteners, in this case the fastener 63. The free end 69 of the fish tape is positioned to extend outward of the reel sections and to contact the outer walls 27 of the reel sections as shown in FIGURES 1, 2 and 7.

The tape winder 17, which is shown most clearly in FIGURES 3, 4, 5 and 6, is generally flat and irregularly shaped and preferably may be molded of plastic such as polycarbonate. The tape winder has an arcuate shaped guide portion 71 with an H-shaped transverse cross-section as viewed in FIGURES 2 and 4. This guide portion consists of an outer flange 73 and an inner flange 75 which are connected by a center web 77. A handle portion 79 is formed as an integral part of the tape winder 17. An opening 81 is formed in the handle portion to facilitate manipulation of the winder. A transversely extending passage for the fish tape in the shape of an open channel 83 is formed in one side of the tape winder 17 and extends through the flanges 73 and 75, across the center web 77 and across the handle portion 79. The channel is bounded by side walls 85 and 87 which generally diverge in a direction away from the outer flange 73. A tape retainer 89 extends across the top of the channel from side wall 87 leaving a slot 88 of sufficient width between the retainer and the channel side wall 85 to insert a tape. An opening 91 may be formed in the handle portion 79 directly behind the tape retainer 89 to facilitate molding of the tape winder.

A precoiled fish tape 15 may be held together in an assembled reel by means of burstible strings or ties such as the polyethylene ties 93 shown in FIGURE 7.

The use, operation and function of the invention are as follows:

The reel 13, fish tape 15 and tape winder 17 may be assembled as a composite reel assembly 11 in the following manner. One of the reel sections 19 may be supported with its annular walls 23, 25 and 27 projecting upwardly. This section will be called the lower reel section for purposes of description. A precoiled fish tape 15 held together by ties 93 may then be placed on the lower reel section 19 in the inner annular channel 29 with the looped bitter end 65 of the tape positioned over the opening 51 and the free end 69 of the fish tape extending outwardly of the annular wall 27 of the reel section. The tape winder 17 may then be placed on the lower reel section with its outer flange 73 seated in the outer channel 31 and with its inner flange 75 in engagement with the outer periphery of the outer wall 27 of the reel section.

A second identical annular section 19 of the reel may then be positioned over the first reel section, fish tape and tape winder with its annular walls 23, 25 and 27 projecting towards the first reel section. The second reel section, which for purposes of description will be called the upper section, may then be positioned over the lower section in the manner shown in FIGURE 8 with the quadrant shaped segment 37 of wall 23 of the upper section positioned over the quadrant segment 33 of wall 23 of the lower section. Upon rotation of the upper section 19 through a 90° angle clockwise relative to the section 19, as viewed in FIGURE 8, the projecting rib 55 will mesh with the groove 57 of the segment 35 and the projecting rib 53 will mesh with the groove 59 of the segment 39 to lock the sections together. As the sections are rotated into locking engagement, they will move axially into contact with each other due to the pitch of the projecting ribs and grooves. Also, rotation of the sections relative to each other will be stopped positively when the high end of quadrant segment 39 of the upper reel section contacts the high end of segment 35 of the lower reel section and the high end of segment 35 of the upper reel section contacts the high end of segment 39 of the lower reel section. Further, the openings 49 and 51 in the upper and lower reel sections will be aligned to receive the fasteners 61 and 63. Thus, when the sections are interlocked as shown in FIGURES 1 and 2, the threaded fasteners 61 and 63 may be installed through the aligned openings 49 and 51 to prevent unlocking rotation. One of the threaded fasteners, in this case the fastener 63, will also extend through the looped bitter end 65 of the fish tape to lock the fish tape in position. The reel assembly 11 is now in condition for use.

In the assembled condition of the reel assembly 11, the fish tape 15 will engage and spread the outer walls 27 of the reel sections 19 to permit the tape winder 17 to be moved around the circumference of the reel and the fish tape to be unreeled. The spreading action of the tape is shown most clearly in FIGURE 2. As previously described, the fish tape passes through the passage formed by the channel 83 in the tape winder 17 and bears alternatively against the walls 85 and 87 of the winder. Movement of the fish tape winder around the periphery of the reel will either force the tape into or out of the reel. For example, if the tape winder is moved in a clockwise direction as viewed in FIGURE 1, the tape will be forced out of the reel. The pressure of the outer walls 27 of the reel sections against the fish tape will prevent uncoiling of the tape except when the tape is pulled out of the reel. Rewinding of the tape into the reel is accomplished by moving the tape winder in the opposite direction, in this case counterclockwise as viewed in FIGURE 1.

The intermediate walls 25 of the annular sections 19 being of less height than the outer walls will not contact each other when the sections are assembled and will not engage the tape during its winding and unwinding movements, but will be positioned close enough to each other to prevent the coiled portions of the tape from contacting the outer flange 73 of the tape guide and will prevent accidental jamming of the tape and the tape winder.

The construction of this reel assembly also permits the replacement of a fish tape without requiring threading of a replacement tape through the tape passage in the tape winder. A defective tape 15 may be replaced simply by disconnecting the reel sections 19, removing the defective tape, inserting a new coiled fish tape in the annular channel 29 of a reel section, extending the tape through the slot 88 and into the channel 83 of the winder, and then reassembling the reel sections. The binding means 93 may be left on the coiled tape to hold it in coiled position until the tape is first pulled out of the reel at which time the binding materials 93 will break permitting the tape to be uncoiled.

The use of different plastics for the tape winder 17 and the reel sections 19 such as a high density polyethylene for the reel sections and a polycarbonate for the winder results in a lower frictional resistance during relative movement of these parts. While two suitable plastics have been referred to, it should be understood that other suitable plastics may be used. It should also be understood that although a preferred form of rotational interlock between the reel sections has been shown and described, the invention is not limited to this specific structure and other suitable rotational interlocks may be used. The same is also true of the tape winder, other suitable forms may be used. Thus, the scope of this invention should be limited only by the appended claims.

I claim:

1. An electrician's fish tape reel assembly including:

an electrician's fish tape, a reel adapted to receive and hold said electrician's fish tape and to permit unwinding and rewinding of the tape relative thereto, said reel including a pair of generally annular shaped sections removably connectable with each other, each of said annular sections being generally flat and having upstanding inner and outer peripheral walls with similar walls of each section adapted to contact one another when said sections are connected together, said sections being removably connectable by means on each section which interlock upon rotation of the sections relative to each other, a tape winder formed and adapted to be guided on the outer peripheral walls of said annular sections for circumferential travel around said reel, said tape winder having a passage extending therethrough to guide said fish tape into and out of said reel, an opening into said passage extending through the side of said tape winder to permit said tape to be placed into said passage from the side of said winder, and means to selectively prevent unlocking rotation of said annular sections.

2. The structure of claim 1 further characterized in that said inner peripheral walls are interlocked upon rotation by the engagement of matching male and female threads formed thereon.

3. The structure of claim 2 further characterized in that said threads are inclined to the central axis of said reel.

4. The structure of claim 2 further characterized in that the thread portions of each inner peripheral wall are alternately male threads and female threads with each thread extending through approximately a 90° arc.

5. The structure of claim 1 further characterized in that the means to prevent unlocking rotation of the annular sections relative to each other are threaded fasteners.

6. The structure of claim 5 further characterized in that one of said threaded fasteners is adapted to secure the bitter end of the fish tape to the reel.

7. The structure of claim 1 further characterized in that a third upstanding wall is formed on each annular section concentric with and located between said inner and outer walls with the height of said wall being less than that of said outer wall.

8. The structure of claim 7 further characterized in that said tape winder has a laterally extending flange adapted to ride between said outer and said third upstanding walls of said reel sections.

9. The structure of claim 1 further characterized in that said side opening into said tape guiding passage of said tape winder is offset relative to said passage to prevent accidental disengagement of said tape from said tape winder.

10. The structure of claim 1 further characterized in that said fish tape may be held in a coiled position by burstible means.

11. The structure of claim 1 further characterized in that said annular sections and said tape guide are made of different plastics for lower sliding friction between said parts.

12. An electrician's fish tape reel including a pair of generally annular shaped sections removably connectable to each other,
    each of said annular sections being generally flat and having upstanding inner and outer peripheral walls with similar walls of each section adapted to contact one another when said sections are connected together,
    said sections being removably connectable by means on each inner peripheral wall which interlock upon rotation of the annular sections relative to each other, and
    means to selectively prevent unlocking rotation of said annular sections.

13. The structure of claim 12 further characterized in that said means on each inner peripheral wall which interlock upon rotation of the sections relative to each other including matching male and female threads formed thereon.

14. The structure of claim 13 further characterized in that said threads are inclined to the central axis of said annular shaped sections.

15. The structure of claim 13 further characterized in that the thread portions of each inner peripheral wall are alternately male threads and female threads with each thread extending through approximately a 90° arc.

16. The structure of claim 12 further characterized in that the means to prevent unlocking rotation of the annular sections relative to each other are threaded fasteners.

17. The structure of claim 16 further characterized in that one of said threaded fasteners is adapted to secure the inner end of a fish tape installed in the reel.

18. The structure of claim 12 further characterized in that a third upstanding wall is formed on each annular section concentric with and located between said inner and outer walls with the height of said wall being less than that of said outer wall.

19. A tape winder for use with a fish tape reel assembly,
    said winder having means to engage and be guided on the outer peripheral walls of a reel for circumferential movements,
    a passage extending through the winder to receive and guide a fish tape into and out of said reel,
    said passage being wider than the tape,
    an opening into said passage from one side of said tape winder to permit said tape to be placed into said passage from the side of said winder, and
    retaining means extending partially across the opening into said passage to prevent accidental disengagement of said tape from said passage.

20. An electrician's fish tape reel including:
    a pair of generally annular shaped reel sections adapted to be connected to each other,
    each of said annular sections being generally flat and having upstanding inner and outer peripheral walls with similar walls of each section adapted to come together when said sections are connected together,
    means to connect said reel sections together, and
    a third upstanding wall formed on each reel section concentric with and located between said inner and outer walls with the third wall on one section being spaced from a third wall on the other section when the sections are connected together so that said spacing is great enough to permit the passage of the fish tape between said walls to the outside of the reel but is sufficiently small to prevent the coiled tape from entering the space between said third wall and said outer wall.

21. The structure of claim 20 further characterized in that the radial spacing between said third and outer walls is sufficiently large to allow a guide member of a tape winder to move in said space circumferentially of said reel.

References Cited

UNITED STATES PATENTS

| | | | |
|---|---|---|---|
| 2,271,943 | 2/1942 | Klein et al. | 220—40 X |
| 2,969,953 | 1/1961 | Shaw | 254—134.3 |
| 3,067,984 | 12/1962 | Linden | 254—134.3 |
| 3,169,682 | 2/1965 | Hollingsworth | 206—52 X |

OTHELL M. SIMPSON, *Primary Examiner.*

U.S. Cl. X.R.

206—52; 242—84.8